May 23, 1939.  H. FÖTTINGER  2,159,143

HYDRAULIC TRANSMISSION GEAR

Original Filed April 4, 1934

Inventor:
Hermann Föttinger
By Young Emery & Thompson
Attorneys

Patented May 23, 1939

2,159,143

UNITED STATES PATENT OFFICE 2,159,143

HYDRAULIC TRANSMISSION GEAR

Hermann Föttinger, Berlin-Wilmersdorf, Germany

Original application April 4, 1934, Serial No. 719,008, now Patent No. 2,116,461, dated May 3, 1938. Divided and this application December 27, 1937, Serial No. 181,866. In Germany April 6, 1933

1 Claim. (Cl. 60—54)

The present application is a division of applicant's Patent No. 2,116,461, issued May 3, 1938.

In the well-known hydraulic transmission gears or turbo-transformers which consist of pump wheels, turbine wheels and guide wheels the speed of the turbine wheels, viz., the secondary wheels, changes within wide limits in accordance with the resistance to be overcome. The speed of the pump wheels being kept constant, the normal speed and the highest efficiency will be obtained with a definite torque of the turbine, viz., the so-called normal torque of the turbine wheels. When the speed of the turbine is reduced, for instance at starting or by hard braking, the torque of the turbine increases by itself and the amount of increase will be dependent on the number, the radii and the blading of the turbine wheels and the guide apparatus as well as of the type of the pump. As the speed of the turbine increases, the torque inversely decreases until in the case of no-load work the torque has dropped to zero. When hydraulic transmissions are built in, e. g., into automobiles, various tractive efforts, that is various torques must be successively overcome. Consequently the speed of the turbine adjusts itself according to the torque to be overcome and thus also the running speed of the car is automatically adapted without steps to the amount attainable. Therefore the decrease of the speed is automatically accompanied by an increase of the torque.

The hydraulic transmission gears hitherto built were as a rule intended for ships and similar purposes where an increase of torque for starting would be unnecessary and useless. The only intention was to arrive at a maximum efficiency with the normal run. Of course, also in this instance a corresponding increase of the torque took place at starting, viz., with the minimum of angular speed, and in such a way that the starting torque amounted to about double the normal torque and the no-load speed to about double the normal speed of the turbine. The curve of the efficiency was similar to a parabola the vertex of which coincides with the point of normal speed.

In the case of land vehicles, lifting machinery etc. it is desirable that the tractive effort, viz., the torque be increased at starting as much as possible by a suitable design of the hydraulic system. The ideal shape of the speed curve would be the so-called "ideal tractive-effort hyperbola" which, however, could be arrived at only in the case of gears free of loss and would result at an infinitely large tractive effort in the start. The ideal tractive-effort hyperbola can, of course, not be attained in a transmission gear practically built, although it would be the most ideal design for the use on land vehicles etc.

Now, it is an object of the present invention to provide for a hydraulic transmission gear which is particularly suited for land vehicles, lifting machinery and the like and shows a torque or tractive-effort curve as favorable as possible, that is a torque curve which lies between the ideal tractive-effort parabola and the straight-line increase of torque actually prevailing in the hydraulic transmission gears already known.

The novel means found for the solution of this problem and further improvements of the hydraulic transmission gear as specified in detail in the following description are the subject matter of the present invention. The accompanying drawing shows several embodiments of the invention, and in them—

Figure 1:
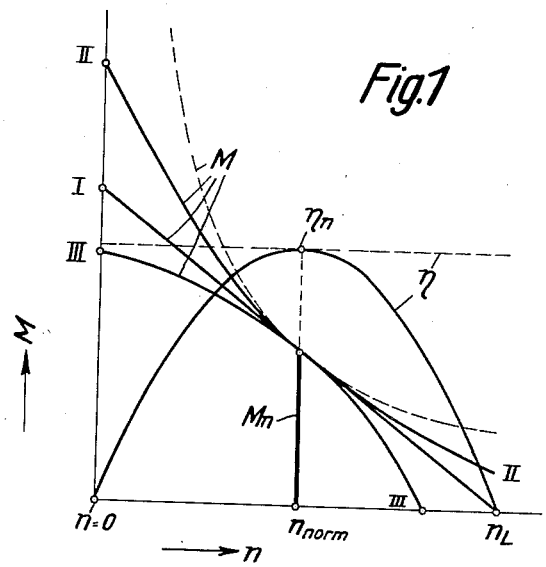
Fig. 1 is a chart of the dependencies prevailing between torque, speed and efficiency in prior transmission gears, this chart explaining the object of the present invention.

In the chart Fig. 1, the abscissae represent the angular speeds and the ordinates the torques. With a normal speed $n_{norm}$ the normal torque is $M_n$. When the speed is decreased, the torque increases; when, however, the speed rises, the torque drops.

In the well-known earlier constructions of the inventor the latter used turbines with an admission directed to the interior (Francis type) with three to five turbine stages or there were used two or three complete turbine circuits with the same direction of rotation. This arrangement resulted in torque curve M designated by I in Fig. 1, viz., in a straight line. At the start the torque was about double as high as the normal torque $M_n$ and when running without load the speed $n_L$ was about double as high as the normal speed.

Another well-known transmission gear (the Rieseler gear, U. S. Patent No. 1,727,903) has a torque line designated by III in Fig. 1, when running in the hydraulic circuit with a two-stage turbine and a guide device alternately immobilized by hard braking or running free. In this instance the starting torque is even lower so that this arrangement is still less suitable for land vehicles, lifting machinery, etc.

In the other transmission gears known, for instance the Ljungström, Lysholm gears (U. S. Patent 1,900,120), a great many turbine steps, but at least three stages with radial blading are used and particularly steep outlet angles are provided for. Also in that instance the intention was to fully remove the tangential component $c_u$ of the absolute velocity of flow prior to the return of the water into the pump (so-called vertical admission). This resulted in a curve like that designated by II in Fig. 1 and which is much more advantageous than curve I. It lies between the latter and the dotted "ideal tractive-effort hyperbola" as plotted in Fig. 1 which also comprises the parabolic curve of the efficiency $\eta$.

In order to obtain torques similar to those represented by curve II, Coats (U. S. Patent 1,760,397) further made use of a guide apparatus which comprised one fixed guide blade rim and four movable guide blade rims, which are either allowed to freely revolve or the blades of which can freely turn. This turbine was of the Francis type with a small inlet radius and a large outlet radius.

It is obvious from this that as far as it was possible to arrive at a torque curve lying between the straight torque line I and the ideal hyperbola, it was necessary to make use of very intricate designs.

Now, the inventor has found out that degrees of increase of the tractive effort, viz., torque curves like those shown by II and which were attained, so far, only with at least three turbine stages (six wheels) or with one fixed and four revoluble guide blade rims (seven wheels), can already be arrived at with one single turbine stage in one circuit comprising three fixed wheels, accordingly with a fraction of the means hitherto necessary for that purpose.

This effect absolutely unexpected and diametrically opposed to the notion of other specialists is, according to the invention, substantially obtained by the essential combination of the following features, namely:

(a) In the cycle there is disposed in combination with a pump wheel only one secondary wheel the inlet radius of which does not exceed the outlet radius (consequently no Francis turbines).

Figure 2:
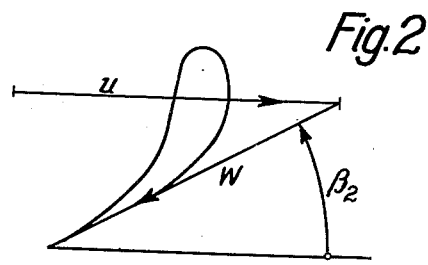
Fig. 2 is a further chart and shows the circumferential velocity at the outlet of the turbine as plotted against the relative discharge velocity and the outlet angle.

(b) The blades of the secondary wheel form flat angles with the circumference at the outlet whereby the peripheral velocity $u$ at the outlet of the turbine must be of the magnitude of the relative discharge velocity $w$ at this point which results in the outlet angles being smaller than 35 degrees (Fig. 2).

(c) The blades of the secondary wheel must be substantially thickened at the inlet and eventually rounded off.

(d) The guide blades being arranged within a chamber connecting the outlet of the secondary wheel with the inlet of the pump wheel at a radius as large as possible.

(e) A bladeless channel having a radial extension as large as possible and being on all sides formed by smooth walls is disposed between the outlet edge of the guide apparatus and the inlet edge of the pump wheel.

The totality of these features results in the surprising progress here disclosed.

The addition hitherto usual of centripetal turbines of the Francis type (inlet radius of the turbine larger than the outlet radius) which works here with very variable delivery heads (and quantities of water) sensibly impairs, e. g., the increase of torque of turbines showing the features (a) or (b+c).

The great increase of the momentum intended by the invention cannot be attained with gears having steep blade angles or blades insufficiently thickened.

The substantially thickened blade heads, per se known in water turbines, serve here the special purpose of sufficiently safely providing for the highly increased torque (particularly during the start) by means of preferably one single turbine rim, in a way which is satisfactory hydraulically and with respect to mechanical strength, whereas this torque was distributed over 2 or 3 turbine rims in the earlier types (U. S. Patent 1,900,120).

The invention is further based on the following important finding: Occasionally it had been observed on the old Fourneyron turbines (outlet radius larger than inlet radius) that the torque characteristic was slightly curved upward towards the hard-braking point, see Escher-Dubs "Die Theorie der Wasserturbinen," 3rd edition, page 2 and pages 171–174. These turbines built into rivers, however, work under other hydraulic conditions than the present transmission gears (torque transformers): In spite of the angular speed varying between normal and zero the height of fall of the river remains constant. In the self-contained transmission gear, however, not only the head of the turbine but also the quantity of water change sensibly, since in the short-circuited circuit a reaction directly takes place on the pump which does not furnish any constant head of water but a head which very sensibly varies with the quantity of water delivered (cf. the Q–H characteristic). The quantity of water, however, adjusts itself in such a way that the total resistances in the pump, turbine and guide apparatus (friction, shocks and head utilised) are overcome.

The finding that the particular application of smaller inlet radii with larger or, at the most, equal outlet radii of the turbine is, among other things, decisive for surprisingly high increases of the torque under the particularly intricate conditions of flow in the present transmission gears, represents a substantial progress in transmission engineering, especially as it permits of doing away with the prejudice that the Francis turbine (with larger inlet and smaller outlet radii), which is advantageous for the maximum efficiency, is also superior for obtaining a high increase of the tractive effort in the start.

A further feature of the present invention consists in that the guide device is or are placed in the zone of radii as large as possible and that the remaining return channel leading to the pump is designed as a chamber without blades but with an interior core. The guide device is to impart a definite twist $c_u \cdot r$ (peripheral component x radius) to the water. When particularly the outlet edge of the guide device is placed at a large $r$, the magnitude $c_u$ and thus the whole velocity of flow $c$ and the friction loss proportional to $c^2$ can be reduced quite sensibly, since the smooth side walls of the subsequent bladeless chamber can be polished, which results in a minimum of friction loss for $c_u$ which is increasing towards the axis of rotation.

In the other views of the drawing similar characters of reference indicate corresponding parts.

Fig. 2 shows one of the usual turbine triangles in which according to the invention the circumferential velocity $u$ and the velocity of flow (here the relative velocity at the channel outlet) are of about the same magnitude. In the case of hard braking $w$ is sensibly increased. The blade angles $\beta_2$ are then smaller than 35 degrees, while in the case of larger angles unsatisfactory ratios $u/w$ would be the result (viz., too small $u$ as compared with $w$). The blade may, e. g., have the rounded shape shown which is per se known in steam turbines, propellers, pumps and water turbines, it may, however, also be pointed in a suitable manner but at any rate it must have substantially thickened inlet ends.

Figure 3:
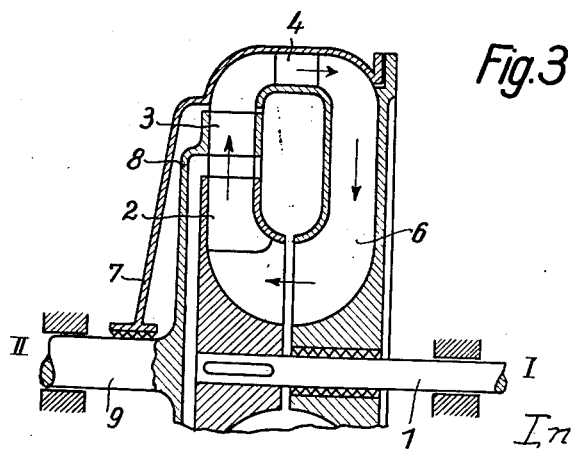
Fig. 3 is a partial section through a hydraulic transmission gear according to the invention.

In the embodiment shown by Fig. 3 the primary shaft 1 carries the pump wheel 2, which delivers the water directly into the coaxial turbine wheel 3 which is coupled with the secondary shaft 9 by means of the disc 8. From here the water flows through the guide rim 4 disposed at the largest radius of the stationary casing 7 and finally back through the bladeless chamber 6 into the pump. This simple arrangement results in particularly satisfactory torque characteristics similar to line II in Fig. 1.

I claim:

A hydraulic transmission gear for the intensified automatic torque increase at the start, comprising a primary pump wheel, a single secondary wheel having blades, the inlet radius of which does not exceed the outlet radius and the blades of the secondary wheel being substantially thickened at the inlet and eventually rounded off and formed with flat angles $\beta_2$ with the circumference at the outlet whereby the relative discharge velocity ($w_2$) and the peripheral velocity ($u_2$) at that point are of substantially the same magnitude at the normal angular speed of maximum efficiency ($n_{norm}$), a chamber connecting the outlet of the secondary wheel with the inlet of the pump wheel, guide means operable in said chamber and being arranged at a radius as large as possible and a blade-less channel having a radial extension as large as possible and being on all sides formed by smooth walls and being disposed between the outlet edge of the guide means and the inlet edge of the primary pump wheel.

HERMANN FÖTTINGER.